US005475375A

United States Patent [19]

Barrett et al.

[11] Patent Number: 5,475,375
[45] Date of Patent: Dec. 12, 1995

[54] ELECTRONIC ACCESS CONTROL SYSTEMS

[75] Inventors: Martin A. Barrett; Wayne F. Larson, both of Salem, Oreg.

[73] Assignee: Supra Products, Inc., Salem, Oreg.

[21] Appl. No.: 99,743

[22] Filed: Jul. 30, 1993

Related U.S. Application Data

[63] Continuation-in-part of Ser. No. 806,801, Dec. 5, 1991, Pat. No. 5,245,652, Ser. No. 864,958, Apr. 7, 1992, and Ser. No. 819,345, Jan. 9, 1992, said Ser. No. 864,958, is a division of Ser. No. 806,801, which is a continuation of Ser. No. 640,255, Jan. 11, 1991, abandoned, which is a division of Ser. No. 303,711, Jan. 27, 1989, Pat. No. 4,988,987, which is a continuation-in-part of Ser. No. 192,853, May 11, 1988, abandoned, which is a division of Ser. No. 15,864, Feb. 17, 1987, Pat. No. 4,766,746, which is a continuation-in-part of Ser. No. 831,601, Feb. 21, 1986, Pat. No. 4,727,368, which is a continuation-in-part of Ser. No. 814,364, Dec. 30, 1985, abandoned, which is a continuation of Ser. No. 788,072, Oct. 16, 1985, abandoned.

[51] Int. Cl.⁶ ..................................................... E05B 49/00
[52] U.S. Cl. ..................... 340/825.310; 70/63; 379/103
[58] Field of Search .................. 340/825.31, 825.54, 340/825.06; 379/103, 105; 70/63; 235/382

[56] References Cited

U.S. PATENT DOCUMENTS

| | | | |
|---|---|---|---|
| 3,337,992 | 8/1967 | Tolson | 340/533 |
| 3,801,742 | 4/1974 | O'Brien et al. | 179/2 R |
| 3,812,403 | 5/1974 | Gartner | 317/134 |
| 3,927,263 | 12/1975 | Fretwell | 179/2 DP |
| 4,157,534 | 6/1979 | Schachter | 340/147 MD |
| 4,209,782 | 6/1980 | Donath et al. | 340/174 MD |
| 4,218,690 | 8/1980 | Ulch et al. | 340/149 R |
| 4,236,068 | 11/1980 | Walton | 235/380 |
| 4,268,721 | 5/1981 | Nielson et al. | 179/2 C |
| 4,275,385 | 6/1981 | White | 340/312 |
| 4,415,893 | 11/1983 | Roland | 340/825.31 |
| 4,436,958 | 3/1984 | Hansen et al. | 179/2 A |
| 4,469,917 | 9/1984 | Shelley | 379/107 |

(List continued on next page.)

FOREIGN PATENT DOCUMENTS

| | | |
|---|---|---|
| 307485 | 3/1989 | European Pat. Off. . |
| 393784 | 10/1990 | European Pat. Off. . |
| 2542792 | 3/1983 | France . |
| 2604808 | 10/1986 | France . |
| 2144249 | 2/1985 | United Kingdom . |
| WO82/04169 | 11/1982 | WIPO . |
| WO88/03294 | 5/1988 | WIPO . |
| WO90/13096 | 3/1990 | WIPO . |
| WO90/13080 | 11/1990 | WIPO . |
| WO91/18169 | 5/1991 | WIPO . |
| WO91/20026 | 6/1991 | WIPO . |

OTHER PUBLICATIONS

Advantage Express Software User's Manual, Supra Products, Inc., 1991.
Advantage Express User's Guide, Supra Products, Inc., May, 1991, 24 pages.
Marino, "Pager and Garage Door Opener Combination," Motorola Technical Developments, vol. 10, 3, 90.
Websters New World Dictionary, p. 1108, definition of radio frequency.

*Primary Examiner*—Michael Horabik
*Attorney, Agent, or Firm*—Klarquist Sparkman Campbell Leigh & Whinston

[57] ABSTRACT

An access control system provides a database in an access control device (i.e. key) and includes procedures assuring that the database, and a master database, are kept up to date. In the particular context of a real estate lockbox system, the keys are provided with a database detailing houses listed for sale in the local area. Updates to this personal database are conditioned on users first uploading to a master database data that their keys have collected in their course of their interactions with lockboxes. Additional features include the provision of statistical data on listing and agent data, a menu by which the access device solicits user feedback on a property just visited, and scheduling appointments to show certain listed properties. Radio communications are used in certain embodiments for updating the database and exchanging other data between the access devices (i.e. keys) and a clearinghouse.

18 Claims, 2 Drawing Sheets

U.S. PATENT DOCUMENTS

| | | | |
|---|---|---|---|
| 4,491,843 | 1/1985 | Boubouleix | 343/702 |
| 4,514,729 | 4/1985 | Szarka | 340/825.06 |
| 4,525,865 | 6/1985 | Mears | 455/186 |
| 4,531,237 | 7/1985 | Bar-on et al. | 455/343 |
| 4,543,995 | 10/1985 | Schroeppel | 128/635 |
| 4,594,637 | 6/1986 | Falk | 361/172 |
| 4,600,829 | 7/1986 | Walton | 235/439 |
| 4,609,780 | 9/1986 | Clark | 179/2 A |
| 4,713,661 | 12/1987 | Boone et al. | 349/884 |
| 4,713,808 | 12/1987 | Gaskill et al. | 370/94 |
| 4,721,954 | 1/1988 | Mauch | 340/825.31 |
| 4,727,368 | 2/1988 | Larson et al. | 430/825.31 |
| 4,727,369 | 2/1988 | Rode | 340/825.31 |
| 4,755,799 | 7/1988 | Romano | 340/543 |
| 4,760,393 | 7/1988 | Mauch | 340/825.31 |
| 4,766,746 | 8/1988 | Herderson et al. | 70/63 |
| 4,777,556 | 10/1988 | Imran | 361/155 |
| 4,800,255 | 1/1989 | Imran | 235/382 |
| 4,808,993 | 2/1989 | Clark | 340/825.31 |
| 4,829,296 | 5/1989 | Clark | 340/825.31 |
| 4,831,374 | 5/1989 | Masel | 340/825.31 |
| 4,851,652 | 7/1989 | Imran | 235/382 |
| 4,864,115 | 9/1989 | Imran et al. | 235/492 |
| 4,887,078 | 12/1989 | Cho | 340/825.48 |
| 4,887,292 | 12/1989 | Barrett et al. | 379/103 |
| 4,896,246 | 1/1990 | Henderson et al. | 361/171 |
| 4,905,003 | 2/1990 | Helferich | 341/110 |
| 4,910,510 | 3/1990 | Davis et al. | 340/825.44 |
| 4,914,732 | 4/1990 | Henderson et al. | 340/825.17 |
| 4,916,443 | 4/1990 | Barrett et al. | 340/825.31 |
| 4,929,880 | 5/1990 | Henderson et al. | 320/30 |
| 4,947,163 | 8/1990 | Henderson et al. | 340/825.31 |
| 4,958,632 | 9/1990 | Duggan | 128/419 PG |
| 4,962,449 | 10/1990 | Schlesinger | 364/200 |
| 4,962,522 | 10/1990 | Marian | 379/5 |
| 4,972,182 | 11/1990 | Novik et al. | 340/825.32 |
| 4,974,253 | 11/1990 | Hashimoto | 379/88 |
| 4,988,987 | 1/1991 | Barrett et al. | 340/825.310 |
| 5,014,049 | 5/1991 | Bosley | 340/825.31 |
| 5,016,273 | 5/1991 | Hoff | 380/10 |
| 5,020,135 | 5/1991 | Kasparian et al. | 455/76 |
| 5,046,084 | 9/1991 | Barrett et al. | 379/100 |
| 5,113,427 | 5/1992 | Ryoichi et al. | 340/825.44 |
| 5,124,696 | 6/1992 | Bosley | 340/825.31 |
| 5,280,518 | 1/1994 | Danker et al. | 379/100 |

ELECTRONIC ACCESS CONTROL SYSTEMS

RELATED APPLICATION DATA

This application is a continuation in part of Ser. No. 07/806,801, filed Dec. 5, 1991, now U.S. Pat. No. 5,245,652, which is a continuation of Ser. No. 07/640,255, filed Jan. 11, 1991, now abandoned, which is a division of Ser. No. 07/303,711, filed Jan. 27, 1989, now U.S. Pat. No. 4,988,987, which is a continuation in part of Ser. No. 07/192,853, filed May 11 1988, now abandoned, which is a division of Ser. No. 07/015,864, filed Feb. 17, 1987, now U.S. Pat. No. 4,766,746, which is a continuation in part of Ser. No. 06/831,601, filed Feb. 21, 1986, now U.S. Pat. 4,727,368, which is a continuation in part of Ser. No. 06/814,364, filed Dec. 30, 1985, now abandoned, which is a continuation of Ser. No. 06/788,072, filed Oct. 16, 1985, now abandoned. This application is also a continuation in part of Ser. No. 07/864,958, filed Apr. 7, 1992, now abandoned, which is a division of Ser. No. 07/806,801, referenced above. This application is also a continuation in part of Ser. No. 07/819,345, filed Jan. 9, 1992. These applications are incorporated herein by reference.

FIELD OF THE INVENTION

The present invention relates to novel uses of portable computers in conjunction with electronic access control systems, and is particularly illustrated in the context of electronic real estate lockbox systems.

BACKGROUND AND SUMMARY OF THE INVENTION

For expository convenience, the present invention is illustrated with reference to an illustrative application, namely electronic real estate lockbox systems. It should be recognized, however, that the invention is not so limited.

Electronic real estate lockbox systems are well known and, over at least the past decade, have made substantial use of computer technology. An illustrative system is shown in the present assignee's U.S. Pat. No. 5,046,084.

Over the past five years, so-called "pocket" or "palmtop" computers have become popular. Examples includes the HP-95LX and HP-100LX manufactured by Hewlett-Packard Company, and the Wizard Organizer OZ-8200 manufactured by Sharp Electronics. Such computers have been used in a number of lockbox-related applications. One is the Portable MLS by Integration Systems, which permits a Wizard computer to serve as a pocket database of real estate listings (i.e. houses listed for sale), in lieu of a conventional paper multiple listing service (MLS) book. MLS listing data can be downloaded into the Wizard either over a telephone line or at a real estate office, and can then be searched for desired listings. Such an arrangement permits a real estate agent to have up-to-date listing data, as contrasted with the one- or two-week old information found in the traditional MLS book.

A related system is the InfoPak system marketed by InfoPak, Inc. This systems uses a dedicated device, termed an InfoReader, to read MLS listing data stored on an InfoCard flash memory card. Listing data is downloaded to the card at a real estate office using an InfoLoader personal computer, which is in modem communication periodically with an InfoServer computer located at the MLS office. Again, the memory card can be updated at any time to provide up-to-date listing data.

While such pocket MLS devices have become popular, and while the general applicability of computers to real estate access control systems has been known for many years, there remain a number of needs that have not yet been satisfactorily fulfilled. It is an object of the present invention to fulfill certain of these unmet needs.

In accordance with one aspect of the present invention, a "palmtop" (which is used generically hereafter to refer to any portable, microprocessor-based device, including palmtop computers, notebook computers, personal digital assistants, and dedicated microprocessor-based key units) is used as an access control device for real estate lockbox applications.

In accordance with another aspect of the present invention, radio communication is employed to relay real estate listing and/or access information between a clearinghouse and an agent's palmtop.

(The term "clearinghouse" is used herein to refer to a central computer used to administer the access control system. In real estate applications, the clearinghouse may be the MLS's central computer. Alternatively, it can be a computer dedicated to access control management, with a link to the MLS's central computer for exchange of data. With upcoming transitions in the real estate marketplace, the clearinghouse may also be a computer maintained for this purpose by other entities, including a local or regional board of realtors, or even by individual real estate agencies, brokers or agents.)

In accordance with yet another aspect of the present invention, access data accumulated in agent keys must be uploaded to the clearinghouse before the clearinghouse provides certain incentive information (such as updated listing information or an update code) to the agent.

The foregoing and additional features of the present invention will be more readily apparent from the following detailed description, which proceeds with reference to the accompanying drawings.

DETAILED DESCRIPTION

To provide a comprehensive disclosure without unduly lengthening this specification, applicants incorporate by reference the disclosures of U.S. Pat. Nos. 4,800,255, 4,851,652, 4,864,115, 5,046,084, allowed application Ser. No. 07/806,801, and application Ser. Nos. 07/790,642, 07/819,345, and 07/864,958.

The above-referenced documents show a number of access control systems using microprocessor-based locks and keys. In accordance with one aspect of the present invention, the functionality associated with the above-disclosed keys is provided into a palmtop by suitable software programming instructions. The palmtop can then communicate with lockboxes to exchange data therebetween and to gain access to the lockbox contents, all as detailed in the above-referenced documents. In addition, the palmtop includes a database of MLS listings.

Figure 1:
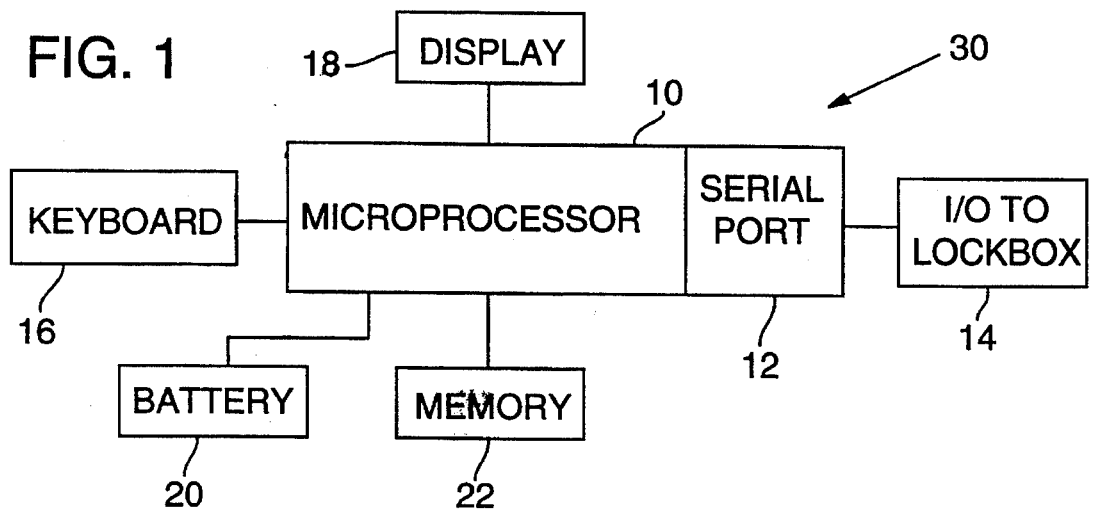
FIG. 1 is a block diagram detailing a palmtop employed in certain embodiments of the present invention.

Referring to FIG. 1, such a palmtop 30 includes a microprocessor 10 (with an associated serial port 12), a lockbox interface 14, a keyboard 16, a display 18, a battery 20 and a memory 22.

Figure 2:
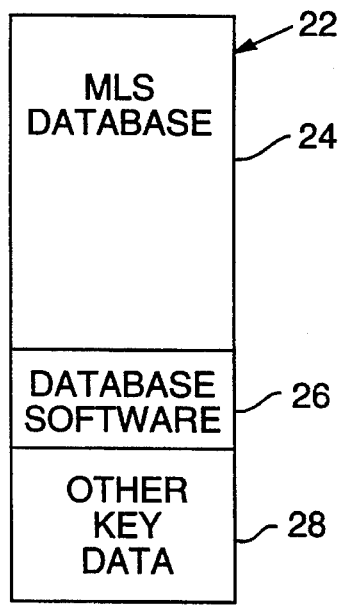
FIG. 2 is a memory map of the memory used in the palmtop of FIG. 1.

FIG. 2 shows the contents of the memory 22 as including MLS listing data 24, a database search engine 26 for searching the listing data 24, and other key data 28. This other key data 28 is more particularly detailed in U.S. Pat. No. 5,046,084 and includes various identification data, access data and characterization instructions.

Palmtops, such as the Hewlett-Packard Company HP-100LX, can be equipped with modems that interface with cellular telephones or pager-like receivers. Using a suitable carrier service (e.g. a cellular carrier or SkyTel), data can be radio-downloaded to such palmtops without user intervention. In an illustrative embodiment in which the palmtop serves as a pocket MLS database, changes to the central MLS database are automatically disseminated to palmtops by radio, assuring that all agents have the latest listing information. The same automatic dissemination of information can likewise be used with any other data, including key characterization instructions and access control data.

Radio can also be used to relay information from the palmtop back to the Multiple Listing Service office. In the access control system disclosed in U.S. Pat. No. 5,046,084, the keys (e.g. palmtops) accumulate access data from each lockbox with which they communicate. In an illustrative system, the lockbox provides the key (e.g. palmtop) with data relating to the lockbox's past five transactions (i.e. the transaction with which the key was involved, and four prior transactions). In accordance with one aspect of the present invention, the palmtop relays this information to the Multiple Listing Service office. There it is compiled with like data from other palmtops, and the transactions that have been reported multiple times are deleted. The resulting database is then disseminated to the real estate offices so that activity at the various listings can be monitored.

In other embodiments, the keys (e.g. palmtops) accumulate data relating only to transactions in which they've taken part.

The relaying of data accumulated by the palmtop to the Multiple Listing Service office can also be effected over telephone lines using a conventional modem. (Hereinafter, references to modems should be understood to include both conventional and radio modems.)

Figure 3:
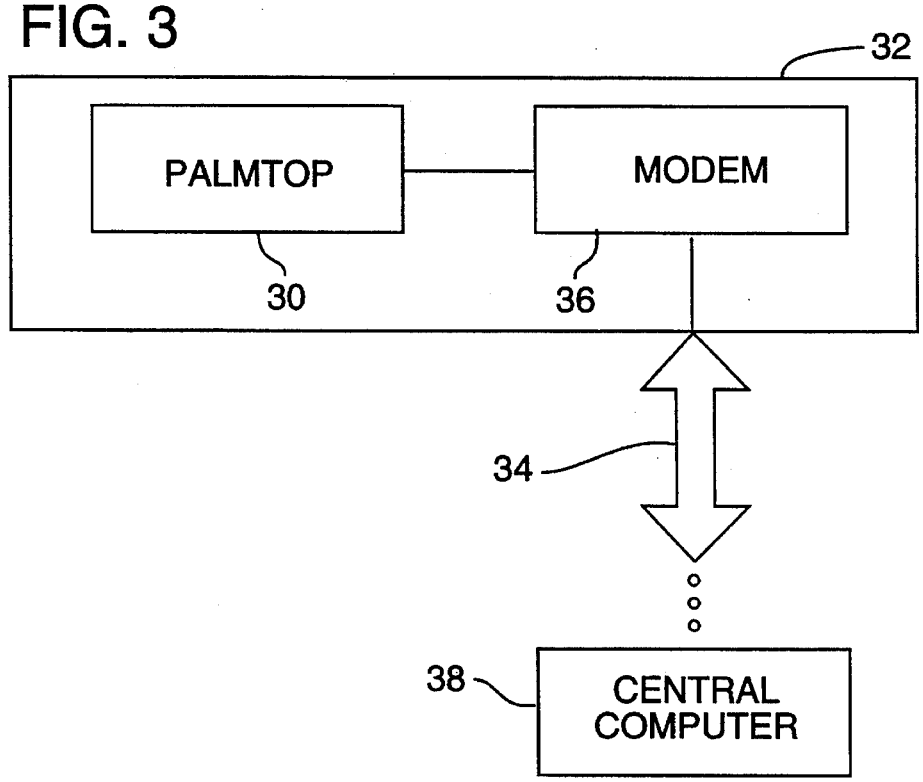
FIG. 3 is a block diagram of an accessory device according to one embodiment of the present invention.

By whatever means is used, the transfer of access data from the palmtop to the Multiple Listing Service office can be effected automatically, or can be done in response to a user's instruction. In the former case, a modem connection is automatically established on a periodic basis between the palmtop and the clearinghouse, and the desired access data is uploaded from the palmtop to the clearinghouse. In an illustrative embodiment, the palmtop 30 (FIG. 3) is nested in an accessory device 32 when not in use. The accessory device couples the palmtop to a communications link 34 (radio or wire) through a modem 36, which exchanges data with the clearinghouse 38.

Regardless of whether a manual or automated system is employed, it is often helpful to provide an incentive to assure cooperation of the agents. In accordance with another aspect of the present invention, this incentive takes the form of updated MLS listing data. The clearinghouse will not provide updated listing information to an agent's palmtop MLS database until access data accumulated in that palmtop is first uploaded to the clearinghouse.

In accordance with another aspect of the present invention, this incentive takes the form of a required update code or rejuvenation data. Update codes are disclosed in U.S. Pat. No. 4,864,115 and in copending application Ser. Nos. 07/740,424 and 07/790,642. Rejuvenation data is disclosed in U.S. Pat. No. 5,046,084 (in conjunction with the "Autolock" feature). Unless a valid update code or rejuvenation data is periodically entered into the key (e.g. palmtop), the key loses its effectiveness. In the prior art, the update code was manually keyed into the key using a keypad. The rejuvenation data was loaded electronically. (Update codes and rejuvenation data hereafter are both referred to using the "update code" terminology.) In accordance with this aspect of the present invention, the update code is loaded into the palmtop via a modem connection with the clearinghouse. (The frequency by which update codes are required can be set as needed. In an illustrative system, 24 hour updates are utilized so as to assure timely information to the clearinghouse. Weekly updates are well suited in some applications. Of course, any other period can be set, ranging from minutes to weeks.)

In both of these systems, unless the palmtop is nested in the accessory device and the access data uploaded to the clearinghouse, the incentive data (be it updated MLS listing data or a new update code) is not provided to the palmtop. If updated MLS listing data is the incentive data, the agent will be at a relative disadvantage with other agents who have the updated data. If a new update code is the incentive data, the agent's palmtop will be inoperative as an access device. (In automated systems, the incentive data is automatically provided to the palmtop immediately following the transfer of the lockbox access data from the palmtop to the clearinghouse.)

By the foregoing arrangements, it is not necessary for the listing agency to send a courier or other person to the listing to retrieve access data from a lockbox; instead the data is relayed to the Multiple Listing Service office clearinghouse by the palmtops with which the lockbox communicates. This arrangement further addresses the problem of a lockbox being removed from a listing and never returned to the multiple listing service. The data contained therein would normally be lost, but by the present arrangement is periodically relayed back as it is compiled.

The ready availability of listing access data is a tool that holds great promise in real estate marketing. It permits the listing agent to make follow-up calls to agents who have shown certain properties, to answer questions, and to do what good real estate agents do well: turn prospects into sales.

It should be noted that requiring new update codes on a frequent basis provides important enhancements to system security. A daily change in such codes means that the multiple listing service can deauthorize certain users within 24 hours (or less) of the need arising, as contrasted with up to 30 days in the prior art. Still more frequent updates (or less frequent updates) can be used if desired. Further, with the update code, the clearinghouse can also download into the palmtop new system data, such as lockout lists. A technique for disseminating such system data throughout a lockbox system is disclosed in U.S. Pat. No. 5,046,084, in which each key/lockbox transaction is accompanied by an exchange of updated system data. By providing such system data to the keys more quickly (by virtue of the 24 hour update frequency), the lockboxes likewise receive the lockout list data (or other system data) more quickly.

U.S. Pat. No. 5,046,084 details a number of other important features that are readily implemented with the superior hardware and I/O resources of a palmtop. Among these are shown-by-appointment and time-zoning. Shown-by-appointment refers to a feature whereby an agent must enter an auxiliary code into the lockbox (via the key/palmtop) before the lockbox will permit access to the house key. Time-zoning refers to a feature whereby a listing agent can program a lockbox to respond only during certain hours of the day, assuring privacy to the owner of the home during other hours.

In the system disclosed in U.S. Pat. No. 5,046,084, the shown-by-appointment and time-zoning features are activated by characterization instructions provided to the lockbox. In accordance with another aspect of the present invention, these and other lockbox characterization instructions can be provided to the lockbox directly from a listing agent's palmtop, rather than through a more cumbersome programming process. That is, the listing agent's palmtop has software that lists each of the lockboxes for which he or she is responsible, and a menu-assisted program for tailoring the characterization instructions for each. Once the listing agent has set the characterization instructions in the desired manner, they can be readily downloaded to the appropriate lockboxes. This downloading can be achieved either in a direct transaction between the listing agent palmtop and the lockbox, or relayed through intermediary means. One such means is a radio link, wherein the characterization instructions are provided by the listing agent to the clearinghouse (by direct transaction, or modem connection), and thereafter radioed to the lockbox at the listing.

A number of other features, not previously feasible, can be implemented using palmtop-based access devices. One is customer feedback. After using a palmtop to access a lockbox, the agent closes the cover (putting the palmtop in a low power state) and shows the house. When the palmtop is next opened, the display presents a brief questionnaire relating to the property just shown. An exemplary menu presentation may invite the agent to enter numbers as follows:

| | |
|---|---|
| 1 | objection to price |
| 2 | objection to interior condition |
| 3 | needs cash allowance for needed improvements |
| 4 | not interested at all, please don't call |
| . | |
| . | |
| . | |
| 9 | type in other comments. |

The next time the palmtop is in communication with the clearinghouse, this information is uploaded and compiled with similar information from other agents for presentation, in interpreted fashion, to the listing agent and/or agency. The listing agent, in turn, can discuss such feedback with the owner of the listed property and, if appropriate, make suitable changes before the property becomes "stale" on the market. (If, for example, 72% of the people viewing a listing opine that the carpeting is ugly, a prudent agent would likely take steps immediately to replace the carpet.)

The foregoing feedback menu is exemplary only. Desirably, the menu can be tailored by the listing agent as best suits the listed property.

Customer feedback is only one of many reporting features that can be implemented in accordance with the present invention. Statistical information on agent activity and listing activity are others.

In many real estate firms, agents are provided office space and support services free of charge, in return for certain commission income. However, up until now, there has been no accurate way for a firm to assess an agent's activity. (Closed sales are an uncertain indicator.) To fulfill this need, in accordance with another aspect of the present invention, the Multiple Listing Service provides real estate firms with periodic reports detailing the activity of each of their agents. These reports are prepared by the clearinghouse from the access data uploaded from agent keys/palmtops. By this arrangement, real estate firms can retain those agents whose activity merits the financial overhead associated with office space and support, and can identify other agents who might best be replaced.

As with many other features of the invention, agent activity reports can be compiled on a daily or weekly basis using the timely data uploaded from the agent keys/palmtops.

Listing activity can be compiled in a like manner. By receiving up-to-date reports on listing activity from the clearinghouse, listing agencies can quickly adapt their advertising to highlight promising properties before they become lagards on the market.

These reports and others can be relayed from the clearinghouse to the real estate firms (or even to the individual real estate agents) by modem, synthesized voice, or by using the FAX reporting technology disclosed in U.S. Pat. No. 5,046,084.

In accordance with another aspect of the present invention, an agent's palmtop is used to schedule house showings. Often, a house listed for sale is occupied by the present owner and is not always available for showing. To determine whether a given time is suitable for a showing, an agent uses the palmtop and modem to call the clearinghouse. The agent identifies the house and the desired showing time by entry of suitable data on the palmtop. The clearinghouse checks its database to determine whether the house is vacant. If it is, this fact is immediately signaled back to the inquiring agent.

If the house is not vacant, the clearinghouse can be programmed to follow several courses of action. One is to refer to a database that identifies preauthorized showing times for that particular listing. If the requested time is found to be within a preauthorized showing time, the clearinghouse immediately signals this fact back to the agent. If it is not, the clearinghouse can suggest to the inquiring agent, using a voice synthesizer, alternative times that other agents have not already scheduled. (The use of a synthesizer at the MLS office to voice data to human users is disclosed in U.S. Pat. No. 5,046,084.) The pre-authorized showing times can be revised, at will, by the listing agent or homeowner by suitable modem or TouchTone instructions.

Another course of action is for the clearinghouse to telephone the listing agent responsible for the home and inquire, again using the voice synthesizer, whether the requested time is suitable. (The clearinghouse can also identify the inquiring agent, and any other pertinent information.) The listing agent can respond "yes" or "no" using prearranged keys on a TouchTone phone. Alternatively, the listing agent can decline the suggested time but propose a different time that would be suitable, again using suitable TouchTone keys. If the listing agent is unsure of suitable times, he or she can use yet another TouchTone key to signal that an inquiry to the homeowner will be necessary. After making the inquiry, the listing agent telephones the clearinghouse and, after identifying the purpose of the call by suitable Touch Tone signals, indicates whether the earlier-requested time is suitable. On receiving instructions from the listing agent, the clearinghouse either telephones the inquiring agent's modem number and provides a response to the agent's palmtop, or telephones the inquiring agent's voice number and provides a response using the synthesized voice.

Alternatively, the listing agent can be bypassed and the clearinghouse can communicate directly with the owner of the listed house.

In the system disclosed in pending application Ser. No. 07/819,345, an agent seeking to show a listed house first calls the clearinghouse and requests preauthorization. In response, the clearinghouse provides, to either the agent's key or to the house's lockbox, data enabling the agent to access the lockbox on the listed house, together with data restricting the time of permitted access, if desired.

It will be recognized that this same principal can be employed in the present invention. In response to a request from an inquiring agent, the clearinghouse can provide, either by radio or wired connection, access data to the inquiring agent's palmtop, enabling the agent to access the listing's lockbox.

In certain embodiments, restrictions on access times are downloaded to the palmtop from the clearinghouse along with the access data. Thus, the palmtop is authorized to access the lockbox, but only during certain hours. In this way, a time-related restriction on access is actually effected via the key itself, rather than the lockbox. In some embodiments, these time parameters are set by the listing agent or the homeowner either by modem or TouchTone instructions, and can be updated as desired. In other embodiments, the clearinghouse assigns different times (within a listing agent/homeowner preapproved window of times) to different showing agents as marketing concerns dictate. (In some instances, the clearinghouse might schedule all inquiring agents for the same hour, so as to create the impression of tremendous interest in a property; in other instances, the clearinghouse may schedule different times for different showing agents, so that potential purchasers are undistracted by others inspecting the property.)

Still another feature that is possible in accordance with the present invention is to update showing instructions in real time. Prior art printed MLS books have had showing instructions associated with each listing. The showing instruction might say "Lockbox," meaning the house is available at any time, and the key is in the lockbox. Or, the showing instruction might say "Call listing agent first," meaning the listing agent has information required in order to show the house (i.e. burglar alarm information). However, such showing instructions have been static and generally of very little help.

In accordance with this aspect of the present invention, these showing instructions can be updated at will by the listing agent (or even the homeowner) by suitable instructions to the clearinghouse. Thus, if today is Tuesday and the homeowner doesn't want the house shown on Thursday for some reason, the showing instructions can be updated accordingly, as by modem or TouchTone instructions to the clearinghouse. All agents who review the listing data thereafter will be informed, by the showing instructions, that the house is not to be shown this Thursday. This enhancement makes the processing of selling a house less stressful on the homeowner since it gives them meaningful control that was previously unavailable or cumbersome to effect.

Communication between a palmtop and a lockbox can take a number of forms. One is infrared communications, using a protocol being standardized by Hewlett-Packard Company. Infrared communications ports are standard on many Hewlett-Packard Company products, including certain of its palmtops. Alternatively, communication can be effected by other forms of electromagnetic coupling, such as are shown in U.S. Pat. No. 5,046,084 and in U.S. Pat. No. 4,864,115. Direct coupling can also be employed, as disclosed in U.S. Pat. No. 4,851,652 and application Ser. No. 07/790,642. Some of these communication techniques permit not just data, but also power, to be exchanged between units. Thus, in many implementations, one unit (often the lockbox) needn't be provided with a battery, but is instead operated with power relayed from the other unit. In still other embodiments, the HP palmtop can be modified by the provision of electrical contact pads on the palmtop panel adjacent the infrared communications port. The electrical contact pads can connect to corresponding pads on the lockbox to provide power from the palmtop battery to the lockbox, while the data exchange is handle by infrared. Stable physical coupling between the two units can be provided in numerous ways to assure that the electrical contact is not interrupted. Magnetic coupling arrangements and physical alignment or clip mechanisms are just two examples. Existing lockboxes with recessed electrical contact pads can be retrofit with adapters that clip in place and bring the contacts out for ready accessibility.

It should be noted that the provision of a power source (e.g. battery) in the lockbox can provide important advantages, but introduces the specter of a lockbox battery dying and the house key being inaccessible. In accordance with another aspect of the present invention, this problem is mitigated by sending battery status reports, possibly transparently (i.e. without user knowledge), to palmtops with which the lockbox interacts. If the lockbox battery is reaching state of low charge, it can include this fact in data transferred to the palmtop. The next time this palmtop communicates with the clearinghouse, the report of a weak battery in the lockbox is relayed. The clearinghouse agency can then send a courier to replace the battery, or can relay this report to the listing agent (or realtor or agency) responsible for the lockbox, and they can attend to same. This latter report can be via phone using a synthesized voice, or can be by a modem connection initiated by either party.

Other status information about a lockbox can similarly be relayed to the clearinghouse via palmtops, again transparently, if desired. If a lockbox is attempted to be accessed by an unauthorized palmtop, for example, this fact can be communicated to the offending palmtop for later relaying to the clearinghouse. Reports of such events can then be compiled and steps taken, if appropriate, to enhance security.

In some embodiments, it is desirable for the lockbox to relay such reports to a plurality of palmtops with which it interacts, so as to assure that the data is relayed to the clearinghouse with a minimum of delay.

In the foregoing embodiments, a palmtop has been used in lieu of a key. Many multiple listing services, however, already have a large installed base of electronic keys. To make efficient use of such existing investments, another aspect of the present invention relates to use of palmtops in conjunction with such existing electronic keys.

Figure 4:
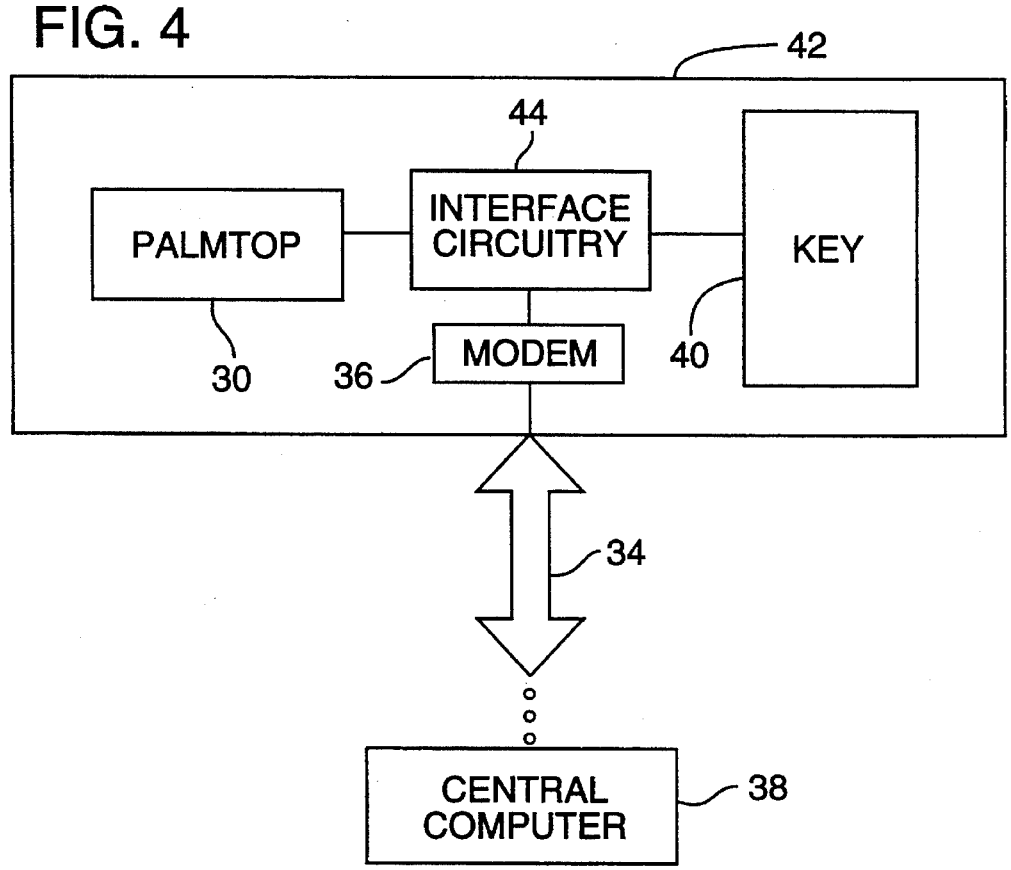
FIG. 4 is a block diagram of an accessory device according to another embodiment of the present invention.

In one such system, the palmtop 30 is used as a personal MLS database, while the key 40 is used to gain access to listings. Both are nested into an accessory device 42 (FIG. 4) for communicating with the clearinghouse. As in the embodiment earlier described, new MLS listing data is not provided to the palmtop until the lockbox access data stored in the key is first uploaded to the clearinghouse. The accessory device also includes interface circuitry 44 by which data stored in the key can be presented to the palmtop for display or longer term storage.

Having described and illustrated the principles of our invention with reference to several illustrative embodiments, it will be recognized that the invention can be modified in arrangement and detail without departing from such principles. For example, while the certain aspects of the invention have been illustrated with reference to radio implementations using Skytel or cellular carriers, it will be recognized that other radio/airwave services can alternatively be employed. For example, the FCC is considering certain spectrum allocations for wireless two-way communications networks in support of "virtual office" technology. Radio communications without third party carriers can also be used.

Similarly, while the invention has been illustrated as employing certain features from the cited patents and applications, it will be recognized that there are numerous other possible combinations of features drawn from these other documents with which systems according to the present invention can be equipped.

Further, while the invention has been illustrated with reference to real estate lock box systems, it will be recognized that many principles thereof are directly applicable to other electronic security applications, such as industrial site security devices, emergency response applications, and other access control systems.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a method of operating an electronic lock system, the system including a plurality of electronic locks and a plurality of electronic keys, the method including using an electronic key to gain access to an area secured by the electronic lock, an improvement comprising:

compiling data relating to recent lock accesses in a key memory;

establishing communication between the key and a clearinghouse; and downloading incentive data from the clearinghouse to the key only after the lock access data is uploaded from the key to the clearinghouse.

2. The method of claim 1 which includes:

compiling data relating to lock accesses in a lock memory;

transferring at least some of said data compiled in the lock memory to the key memory.

3. The method of claim 1 in which the downloading comprises downloading data from the clearinghouse to a database in the key.

4. The method of claim 1 in which establishing communication includes nesting the key in an interface device.

5. The method of claim 1 in which there are plurality of functions the key may perform, and the incentive data is a code needed by the key in order to perform one of said functions.

6. The method of claim 1 in which the incentive data is updated real estate listing data for storage a database in the key.

7. The method of claim 1 in which establishing communication includes establishing an infrared communications link.

8. The method of claim 1 which includes establishing communication between the key and the clearinghouse by radio.

9. The method of claim 8 which includes relaying real estate listing data between the clearinghouse and the electronic key by radio.

10. The method of claim 6 in which the incentive data includes addresses and prices of houses recently listed for sale.

11. The method of claim 1 which further includes:

using a display on the electronic key to solicit user feedback on a real estate property with which an electronic lock recently accessed by the electronic key is associated;

storing said feedback in the electronic key; and relaying said feedback to the clearinghouse.

12. The method of claim 1 in which the electronic locks are real estate lockboxes associated with houses listed for sale, and which further includes compiling reports from data uploaded to the clearinghouse, said reports detailing the activities of different real estate sales agents in showing houses listed for sale.

13. The method of claim 1 in which the electronic locks are real estate lockboxes associated with houses listed for sale, and which further includes compiling reports from data uploaded to the clearinghouse, said reports detailing the frequency with which different houses listed for sale have been shown.

14. The method of claim 1 in which the electronic locks are real estate lockboxes associated with houses listed for sale, and which further includes using the electronic key, in conjunction with the clearinghouse, for a real estate agent to schedule a time to schedule a showing of a house listed for sale.

15. The method of claim 1 in which the electronic locks are real estate lockboxes associated with houses listed for sale, and which further includes downloading showing instructions from the clearinghouse to the electronic key.

16. A method of maintaining a personal database from data stored in a central database, the personal database being maintained in a hand-held device, the method comprising:

accumulating time-sensitive data to be uploaded to the central database, said data relating to recent activity of the hand-held device and being accumulated in the hand-held device;

temporarily establishing a communication link between the personal database and the central database;

transferring data needed by the personal database to keep the database up to dater from the central database to the personal database over said link only after the accumulated time-sensitive data has been uploaded from the hand-held device to the central database; and discontinuing the communication link after the data has been transferred from the central database to the personal database.

17. The method of claim 16 in which the personal database and central database store data related to homes for sale.

18. In an electronic key for an electronic real estate lockbox, the key including a display, a lockbox communications port, a memory and a keypad; the display, port, memory and keypad each being coupled to a key microprocessor, an improvement comprising data stored in the memory specifying at least the addresses and prices of houses listed for sale, together with database software permitting said data to be searched.

* * * * *